United States Patent [19]

Heeg et al.

[11] 3,867,349

[45] Feb. 18, 1975

[54] ADDITION OF DIMETHYL TEREPHTHALATE AND ETHYLENE GLYCOL TO RECYCLED BIS(HYDROXYETHYL)TEREPHTHALATE

[75] Inventors: Rudolf Heeg, Oberhochstadt; Alfred Striebich, Bad Vibel, both of Germany

[73] Assignee: Davy-Ashmore Aktiengesellschaft, Frankfurt/Main, Germany

[22] Filed: May 3, 1973

[21] Appl. No.: 356,796

[30] Foreign Application Priority Data
June 3, 1972 Germany............................ 2227091

[52] U.S. Cl............................ 260/75 M, 260/475 P
[51] Int. Cl.............................................. C08g 17/01
[58] Field of Search...................... 260/75 M, 475 P

[56] References Cited
UNITED STATES PATENTS

| 3,427,287 | 2/1969 | Pengilly | 260/75 |
|---|---|---|---|
| 3,506,622 | 4/1970 | Higgins | 260/75 |
| 3,787,479 | 1/1974 | Griehl et al. | 260/475 |

*Primary Examiner*—Melvin Goldstein
*Attorney, Agent, or Firm*—Molinare, Allegretti, Newitt & Witcoff

[57] ABSTRACT

An improved process for the production of high polymer polyesters wherein the dicarboxylic acid ester is added, as a finely divided solid, to a portion of the reaction product withdrawn from the ester interchange reaction and the resultant mixture is recycled back to the ester interchange reaction.

14 Claims, 1 Drawing Figure

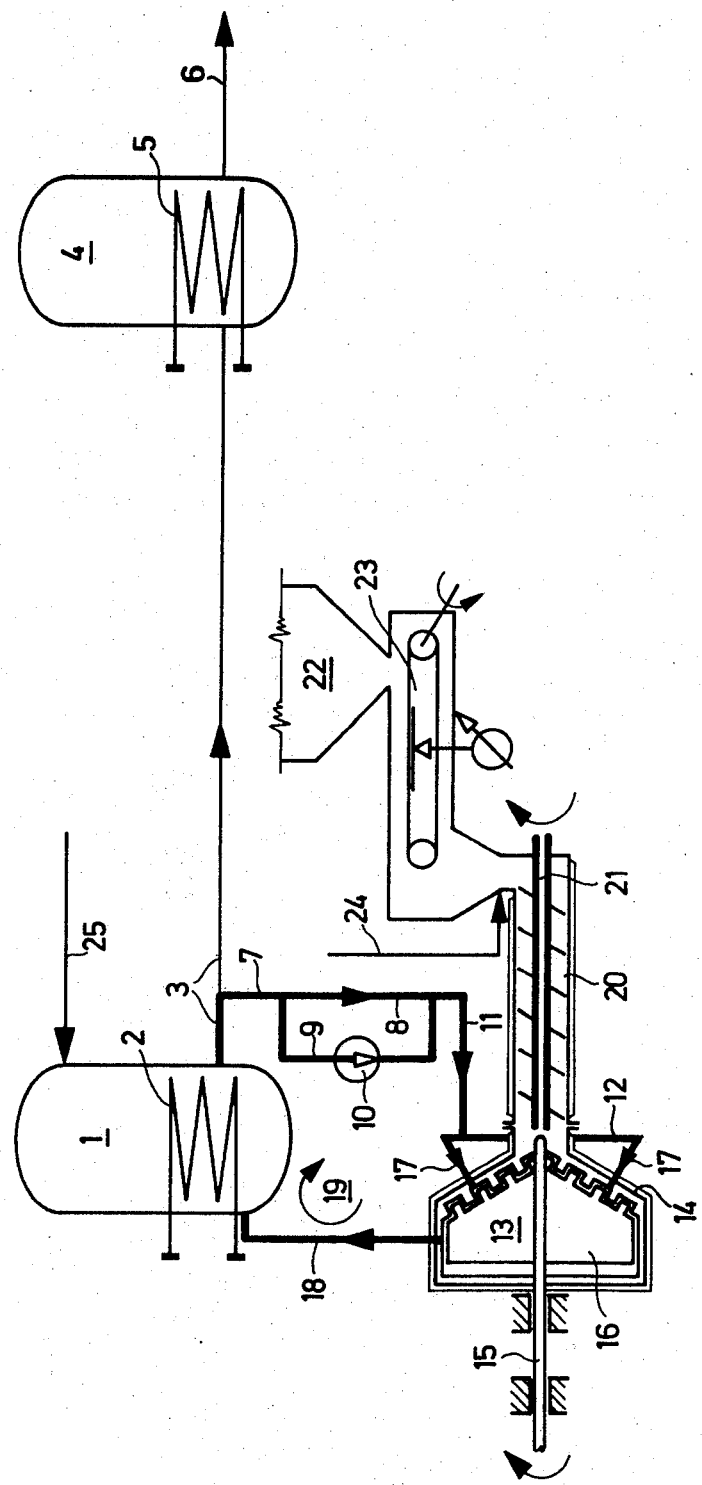

ADDITION OF DIMETHYL TEREPHTHALATE AND ETHYLENE GLYCOL TO RECYCLED BIS(HYDROXYETHYL)TEREPHTHALATE

BACKGROUND OF THE INVENTION

This invention relates to a process for producing high-polymers, in particular spinnable, polyester compositions, by re-esterification of a lower dialkyl ester of a dicarboxylic acid with a diol and the subsequent polycondensation of the resultant ester-interchange product. In this process, the dicarboxylic acid ester is supplied to the ester interchange stage in a finely divided state and there is reacted with the diol.

Traditionally, the feeding of the dicarboxylic acid ester into the ester interchange mixture presents a problem for several reasons. The dicarboxylic acid ester, for example dimethyl terephthalate (DMT) must, on the one hand, suffer no damage during the feeding step but, on the other hand, there should be achieved as uniform and rapid a distribution as possible in the ester interchange mixture. Furthermore, there is required as exact as possible apportioning of the diol with the use of suitable dosing and conveying devices. Because of the demands on the uniformity of distribution and on the accuracy of the dosage, in prior-known processes, the dicarboxylic acid ester has been melted in a special pre-melter and is then supplied to the reactor in liquid form.

As is well known, however, in the prior known melting processes damage occurs to the dimethyl terephthalate because of the inevitable presence of atmospheric oxygen and water in the melter as well as the virtually unavoidable, relatively long residence time in the melter. The damage is expressed in a rise in the acid number and color number of the product. The consequence is lowered ester interchange rate, thereby lengthening the ester interchange time or lowering the degree of ester interchange. To be sure, a reduction of these undesired consequences is possible through corresponding measures, but a complete elimination of the disadvantages cannot be achieved with the conduct of the prior art processes.

To avoid the disadvantages associated with the pre-melting process, it is a known practice to dispense with the melting process and to supply the dicarboxylic acid esters directly to the ester interchange reactor, either in the dry state, i.e., the powder state, or in the form of a paste prepared with the diol required in the ester interchange reaction. Both processes are described, for example, in U.S. Pat. No. 3,553,171. With the known processes, however, no satisfactory conduct of the process is possible. With the use of powder-form dicarboxylic acid ester, the powder must be supplied to the ester interchange reactor from above. In the reactor space, however, there are condensable vapors; for example, in the ester interchange of dimethyl terephthalate and ethylene glycol there is formed methanol, which mixes among the glycol vapors present in the reactor space. These vapors can lead to a lumping of the dicarboxylic acid ester at the entry opening into the reactor. The consequence is an uneven dosage, in which the lumps falling into the reaction mixture further counteract the attempts to obtain a homogeneous distribution. In the case of a charging with a paste of the dicarboxylic acid ester and the diol, a homogeneous mixture is practically impossible to achieve. It can be achieved only with great difficulty, particularly due to the viscosity of the mixture.

SUMMARY OF THE INVENTION

Underlying the invention is the problem of avoiding the disadvantages associated with the known processes and to provide a method by which there is brought about a faultless, uniform dosage of the dicarboxylic acid to a reaction mixture with simultaneous, brief and homogeneous distribution of the acid in the reaction mixture.

According to the present invention, a solution to the problem posed in the prior art processes mentioned is obtained by steadily drawing off a part of the reaction mixture from the ester-interchange stage and recycling that portion back to the ester-interchange stage through an appropriate circulation line. The dicarboxylic acid ester is continuously added in solid form to this circulation line to add the acid ester to the ester-interchange reaction.

Through the process of the invention there is avoided a melting-up process in a special melter positioned ahead of the ester interchange stage thereby avoiding any damage to the dicarboxylic acid ester. The circulating line produces movement in the components to be mixed and contributes to further intensification of the melting and mixing process. The solution according to the invention can also be regarded as a two-stage addition or charging operation since the substance to be added is momentarily supplied to a smaller part of the reaction mixture and this is then subsequently mixed with the entire reaction composition.

The process of the invention is suited quite generally for the reaction of lower dialkyl esters of dicarboxylic acids with diols. It is preferably used, however, for the ester-interchange reaction of dimethyl terephthalate with ethylene glycol, which are reacted with one another to form bis-(2-hydroxyethyl)-terephthalate. Obviously, there are included in the concept of the invention further additional modifications such as the addition of corresponding catalysts, pigments and ether inhibitors.

The invention also contemplates intimately mixing the solid dicarboxylic acid ester with the diol before feeding the acid ester into the recycled part of the reaction mixture. The mixture forms a paste in which the ester is still present in solid form. The total amount of diol required in the reaction can be used in the preparation of the paste, but it is also possible to use only a part of the diol as a dispersion agent and to supply the remaining part of the diol directly to the ester interchange reactor. The above-indicated aspect of the process is preferably suited for a continuous ester interchange reaction. The invention also includes the possibility of charging the dicarboxylic acid ester in finely distributed, initially unmelted state through a mixing and homogenizing device and then combining it with the part of the reaction mixture inside the mixer. Use will be made of such a solution principally in a discontinuous process, when namely, the entire diol is present in the ester interchange reactor at the beginning of the reaction. The use of this modification, however, is not restricted to discontinuous processes, but is also usable in a continuous ester interchange process, when, for example, the diol is to be supplied to the ester interchange reactor continuously, but separately from the dicarboxylic acid ester.

The combining of the dicarboxylic acid ester with the part of the reaction mixture inside the mixer means that the reaction mixture itself is sent through the mixing and homogenizing apparatus.

This brings about not only a very intensive intermixing of the dicarboxylic acid ester, but the reaction mixture itself is also subjected to an intensive thorough mixing which is of special significance for the course of the reaction. If finally, according to the invention, the diol is also supplied to the mixing device, there is achieved a condition wherein the two main starting substances — if there are disregarded the other additions such as catalysts, etc. — are intimately mixed with one another and with the reaction mixture, whereby there is achieved an optimum homogenization of all the components of the starting materials up to the complete ester interchange product.

The process of the invention permits the use of the dicarboxylic acid ester in manifold form. When dimethyl terephthalate is used, the DMT can be fed in the form of powder or flakes, directly to the reaction mixture being recycled. There is expediently used for this addition, a powder conveyor worm, preferably a double worm with a L:D ratio of greater than 5. It is also possible, however, to use dimethyl terephthalate in the commonly available commercial form of pressed, egg-shaped pellets, which can have dimensions, for example, of 30 × 20 × 10 mm. In this case, a preliminary grinding of the pellets is required.

It has been stated that the dicarboxylic acid ester can be added to the circulating reaction mixture in the form of powder or flakes or in the form of a paste worked up with the diol. It is especially expedient to send the reaction mixture itself through a mixing and homogenizing device and to carry out the mixing of the substances to be fed into the reaction in this mixing device. The individual components can also be fed in, in the case of the use of a multistage mixing device, to different stages. If there is intended the use of a paste worked up with the diol, there is recommended the use of a powder conveyor worm with a hollow shaft, in which the diol is fed in through the hollow shaft. Such a device is part of the state of technology and, therefore, does not need to further describe this specification. Directly after this powder conveyor worm there is expediently engaged a mixing and homogenizing device.

As a mixing and homogenizing device, there can be used various apparatuses available on the market. Good results were achieved, for example, with the "Supraton" of the firm of Deutsche Supraton, Bruckmann & Zucker KG, with the "Dispax-Reaktor" of the firm of Janke & Kunkel and with the "Gorator" of the firm of Holscher-Pumpen. These devices consist essentially of a series of concentrically arranged, alternately fixed and rotating teeth, between which the material to be homogenized is added in an essentially radial direction. If the production of a paste of pelletized dicarboxylic acid ester is intended, there is recommended the use of a colloid mill, to which there is simultaneously supplied diol.

If the preparation of a paste is foregone—i.e., in the case of separate feeding of the starting products into the circulation line—there is yielded the further advantage that the molecular ratio of the diol to the dicarboxylic acid ester can be set as low as desired, since no consideration has to be given to the fluidity of a paste. Furthermore, there does not exist the necessity of producing a paste with a low diol constituent. The molar ratio can even be zero, when namely, the diol is fed directly into the ester interchange reactor.

The temperature of the reaction mixture in the ester interchange reactor lies, as a rule, between 140° and 260°, preferably between 160° and 240°C. In a continuous process, the temperature is generally maintained constant in each stage. In a discontinuous operation, the reaction temperature rises toward the end of the ester interchange reaction. If there takes place no preaddition of heat, the part of the reaction mixture in circulation has the same temperature as the reaction. Since the starting materials, i.e., dicarboxylic acid ester and/or diol, are fed in cold, there necessarily takes place a cooling of the part of the reaction mixture in circulation. In no case must the temperature of the circulating mixture go below the melting point of the dicarboxylic acid ester, which, in the case of dimethyl terephthalate is 141.5°C. The weight ratio of the recycled part of the reaction mixture to the added starting substances can be chosen as a function of the temperature prevailing in the ester interchange reactor. In the case of a continuous process, this ratio lies between 3.2:1 and 100:1, preferably between 6.5:1 and 40:1. With the use of dimethyl terephthalate and ethylene glycol and a specific ratio of 6.5:1 the temperature of the circulating mixture drops, through the addition of fresh raw materials, about 30°C. At a ratio of 40:1, the temperature drop is about 5°C. In a discontinuous process, there is recommended a ratio of the recycled portion of the reaction mixture to the added starting materials of between 1.3:1 and 100:1, preferably between 2.1:1 and 40:1. Insofar as possible, the temperature of the reaction mixture, after the addition of fresh starting materials, should not fall below 160°C., so that the ester interchange reaction begins or is continued during the mixing process.

Of further importance, is the ratio of the portion of the reaction mixture circulated per hour to the content of the ester interchange reactor or of the ester interchange stage. It is advantageous to choose this ratio, in the case of continuous operation, between 0.6 and 150, preferably between 1.2 and 70, and in the case of a discontinuous operation, between 0.25 and 150, preferably between 0.4 and 70.

In the process of this invention, during the mixing process, the dicarboxylic acid ester is melted as it encounters the hot ester interchange product and the ester interchange reaction is initiated. Simultaneously, the mixing step which is otherwise necessary in dispersing a solid substance in a liquid, is reduced to a minimum. Even with use of dicarboxylic acid esters, which do not melt in the temperature ranges indicated, there still exists the advantage that the added raw material goes into solution in the reaction mixture more rapidly than in pure diol and the ester interchange reaction proceeds considerably more rapidly in the homogeneous phase. In order to be able to control or regulate the temperature of the reaction mixture within wide limits, there is further recommended the installation of a heat-exchanger in the circulation line.

An apparatus for carrying out the process of the invention can consist of an ester interchange reactor and a dosing and conveying device for the feeding of the dicarboxylic acid ester into the reactor. The apparatus is further characterized, in that the reactor is provided with a circulation or recycle line, and that the output of the conveyance device discharges into the circulation line. In the event that—especially in the case of continuous conduct of the process—the diol is also to be fed into the circulation line, the apparatus is expediently supplemented, according to the further embodiment of this invention, so that after the conveyance device there is engaged a mixing and homogenizing device. In this embodiment, a feed line for the diol discharges into the input side of the mixing and homogenizing device. For the purpose of homogenization of all of the components, including the already partly ester interchanged reaction mixture, the recycled or circulation line system of the apparatus can be selected in such a way that the conveyance path, in the mixing and homogenizing device, is included, at least partially in the circulation line. In this case, the reaction mixture conducted in circulation must necessarily run through the mixing and homogenizing device.

DETAILED DESCRIPTION OF THE INVENTION

An example of performing an object of the invention is to be further described by reference to the schematic diagram accompanying this specification which shows a continuous processing scheme.

In the FIGURE, there is designated an ester interchange reactor 1, which has an internal heating device 2 for the supplying of the required reaction heat. A draw-off line 3 leads to a further ester interchange reactor 4 with an analogous heating arrangement 5. A conduit 6 leads from the ester interchange reactor 4 to subsequently engaged reactors, which can be either further ester interchange reactors or polycondensation reactors.

A recycle line 7 branches off from the outlet line 3. Line 7 branches into a continuous line 8 without a circulating pump and into a line 9 with a circulating pump 10. Through the operation of proper valves (not shown in the drawing), it is possible to run the process both with and without a circulating pump. The lines 8 and 9 connect together downstream to provide line 11, which discharges into an annular line 12. The annular line 12 belongs to a mixing and homogenizing device 13, which operates as a multi-stage toothed-disk mill. The mill consists of a stationary part 14 with several concentric toothed rings and a rotating part 16 driven by a shaft 15, with a corresponding concentric arrangement of several rows of teeth, which interact with the teeth in the stationary part. Several tap lines 17 distributed on the circumference of the mill lead from the annular line 12 into a middle stage of the mixing and homogenizing device 13. A further line 18 leads back to the reactor 1 from the mill. The line system 3, 7, 8, 9, 11, 12, 17 and 18 forms, in common, the recycle or circulation line or loop 19. For the purpose of emphasis this loop is drawn in thick solid lines.

The mixing and homogenizing device 13 has engaged before it, a conveyance device 20, which is constructed, as a powder conveyor worm with a hollow shaft 21. The diol is supplied to the hollow shaft 21. The dicarboxylic acid ester powder fed to the conveyor device 20 comes from a feed silo 22, from which it is drawn off over a suitable dosing arrangement 23 operating as a conveyor-type weigher. Through a line 24, there is supplied to mixing device 20, an inert gas for the purpose of protective gas veiling. Ethylene glycol running back from a distillation column (not shown) is fed to the ester interchange reactor 1 through reflux line 25.

EXAMPLES

EXAMPLE 1

In an apparatus according to FIG. 1, designed for the continuous production of 1 ton/day of polyethylene terephthate, there was circulated 1,680 kg per hour of an ester interchange product 80 percent condensed (with a polycondensation degree of $p=0.1$) and having a temperature of 185°C. The circulating pump 10 was switched on.

Through the hollow shaft 21 of the conveyor device 20 there were fed 22.8 kg per hour of ethylene glycol, heated to 50°C. into the mixing and homogenizing device 13 positioned in the circulation line 19. Together with this glycol, there was added, as ester interchange catalyst, 17.5 g/hr of zinc acetate.

By means of the dosing arrangement 23 there were fed from the storage silo 22, 42 kg per hour of flake-form dimethyl terephthalate (DMT) to the conveyor device 20. The DMT was fed, with the aid of the worm, into the mixing and homogenizing device 13.

Through the feed conduits and the mixing and homogenizing device 13, driven at a turning rate of 2,950 rpm., the glycol was mixed with the DMT and with the hot, 185°C reaction mixture. In this process, the DMT particles simultaneously comminuted. The temperature fell 6°C to 179°C. After the homogenizing, there was present an entirely homogeneous mixture of DMT, glycol and ester interchange product, which was returned to the first ester interchange stage for continuation of the reaction.

EXAMPLE 2

In a reactor for a discontinuous installation, laid out analogously to FIG. 1, for the generation of 2.8 tons of polyethylene terephthalate per individual charge, there were supplied 1,350 kg of ethylene glycol with 1,050 g of zinc acetate heated to 160°C. After reaching this temperature, the circulating pump 10 was switched on and 56,000 kg of the reactor content was circulated per hour.

2,830 kg of flake-form DMT were taken from the supply silo 22 by means of the dosage arrangement 23 within a time of 40 minutes, supplied to the conveyor device 20 and fed, with the aid of the worm, into the mixing and homogenizing device, driven at a speed of 1,450 rpm. The DMT particles were broken up in the process and thereupon mixed with the circulation stream (at first glycol, later reaction mixture) first at 160°C., later at 225°C. As a consequence, the temperature fell at the quantitative ratio set forth, initially by 7°C. and toward the end of the feeding by 12°C. After the homogenizing there was produced a fully homogeneous mixture of initially glycol and DMT, later glycol, DMT and ester interchange product, which, for the continuation of the reaction, was returned into the first ester interchange stage.

EXAMPLE 3

(Comparative Example)

The apparatus according to FIG. 1, was originally equipped with a melting device for the dimethyl terephthalate engaged ahead of the ester interchange reactor 1. This melting device also served simultaneously as supply tank. Under otherwise the same operating conditions, during the ester interchange, it was possible to reach an equally high degree of ester interchange only after a residence time of 67 percent longer in the reaction vessels. An examination showed that even with intensive nitrogen veiling in the melting or supply container with increasing product residence time there took place an exponential rise in the acid number of the molten ester. The associated damage took place through the unavoidable inclusion of water and atmospheric oxygen with the added ester powder. In this process stage, there existed only an inadequate possibility of removing the undesired substances as rapidly as possible. This possibility resulted in the ester interchange rate being lowered proportionally as the acid number increased.

Through the process of the invention, the disadvantageous influences mentioned were so strongly reduced that with constant degree of ester interchange there could be achieved a 67 percent higher throughput. As a result, the economy of the process is considerably improved. Furthermore, it was observed that a substantially more uniform heating surface loading of the heating arrangement 5 was achieved through the preceding homogenization of the raw materials with the reaction product. This led to a desired consistency in the end product through greater control of the reaction conditions, such as temperature, evaporation rate, vapor space load, etc.

We claim:

1. In a process for producing a high-polymer particularly a spinnable, polyester composition by ester interchange of dimethyl terephthalate with ethylene glycol as starting materials to produce bis-(2-hydroxyethyl)-terephthalate and subsequent polycondensation of the ester interchange product, in which the dimethyl terephthalate is supplied to the ester interchange stage in a finely divided state for reaction with the ethylene glycol, the improved process which comprises steadily withdrawing a part of the reaction mixture from the ester interchange stage, maintaining the withdrawn mixture at a temperature above the melting point of the dimethyl terephthalate, continuously adding the dimethyl terephthalate in solid form to the withdrawn mixture, homogenizing the added dimethyl terephthalate and withdrawn mixture in a homogenization device to form a homogenized mixture of dimethyl terephthalate and reaction mixture, and returning the resultant homogenized mixture to the ester interchange stage.

2. A process according to claim 1, wherein the dimethyl terephthalate is mixed intimately with ethylene glycol in a mixing zone to form a paste prior to feeding the dimethyl terephthalate into the withdrawn reaction mixture.

3. A process according to claim 1, wherein the dimethyl terephthalate is admixed with ethylene glycol before combining the dimethyl terephthalate with the part of the withdrawn reaction mixture inside the homogenizing device whereby a paste is formed.

4. A process according to claim 1, wherein the process is a continuous process and the ratio of the withdrawn reaction mixture to the added starting materials is between 3.2:1 and 100:1.

5. A process according to claim 4, wherein the ratio of withdrawn reaction mixture to added starting materials is between 6.5:1 and 40:1.

6. A process according to claim 1, wherein the process is a discontinuous process and the ratio of the withdrawn reaction mixture to the added starting materials is between 1.3:1 and 100:1.

7. A process according to claim 6, wherein the ratio of withdrawn reaction mixture to added starting materials is between 2.1:1 and 40:1.

8. A process according to claim 1, wherein the temperature of the withdrawn reaction mixture is maintained between 140° and 250°C.

9. A process according to claim 8, wherein the temperature is between 160°C and 240°C.

10. A process according to claim 1, wherein the process is a continuous process and the ratio of the part circulated per hour to the content of the ester interchange stage is 0.6 to 150.

11. A process according to claim 10, wherein the ratio is 1.2 to 70.

12. A process according to claim 1, wherein the process is a discontinuous process and the ratio of the part circulated per hour to the content of the ester interchange stage is 0.25 to 150.

13. A process according to claim 12, wherein the ratio is 0.4 to 70.

14. A process according to claim 1 wherein said homogenizing device is a multi-stage tooth-disk mill.

* * * * *